(12) United States Patent
Murao et al.

(10) Patent No.: US 7,939,780 B2
(45) Date of Patent: May 10, 2011

(54) ABNORMALITY DETERMINATION AND ESTIMATION METHOD, AND ABNORMALITY DETERMINATION AND ESTIMATION DEVICE FOR WELD PRODUCT

(75) Inventors: Masuaki Murao, Toyohashi (JP); Makoto Sakakibara, Handa (JP)

(73) Assignee: Denso Corporation, Kariya (JP)

( * ) Notice: Subject to any disclaimer, the term of this patent is extended or adjusted under 35 U.S.C. 154(b) by 1227 days.

(21) Appl. No.: 11/542,900

(22) Filed: Oct. 4, 2006

(65) Prior Publication Data

US 2007/0090098 A1 Apr. 26, 2007

(30) Foreign Application Priority Data

Oct. 20, 2005 (JP) ................................. 2005-306224

(51) Int. Cl.
*B23K 26/20* (2006.01)
(52) U.S. Cl. .......... 219/121.62; 219/121.63; 219/121.83
(58) Field of Classification Search .................... 73/587, 73/620–631; 219/121.6–121.64, 121.83; 702/185
See application file for complete search history.

(56) References Cited

U.S. PATENT DOCUMENTS

| | | | | |
|---|---|---|---|---|
| 2,297,044 A | * | 9/1942 | Barker et al. | 166/133 |
| 3,434,568 A | * | 3/1969 | Caldwell | 367/72 |
| 4,289,030 A | * | 9/1981 | Alers et al. | 73/588 |
| 4,419,562 A | * | 12/1983 | Jon et al. | 219/130.01 |
| 5,142,916 A | | 9/1992 | Yamaguchi | |
| 5,486,677 A | * | 1/1996 | Maischner et al. | 219/121.83 |
| 5,526,689 A | * | 6/1996 | Coulter et al. | 73/592 |
| 5,811,055 A | * | 9/1998 | Geiger | 266/49 |
| 2004/0249611 A1 | | 12/2004 | Murao et al. | |

FOREIGN PATENT DOCUMENTS

| | | | |
|---|---|---|---|
| JP | 359145959 A | * | 8/1984 |
| JP | A-3-8581 | | 1/1991 |
| JP | 6-155056 | | 6/1994 |
| JP | 08168881 A | * | 7/1996 |
| JP | 2000046696 A | * | 2/2000 |
| JP | 2003-290946 | | 10/2003 |
| JP | 02004358487 A | * | 12/2004 |

OTHER PUBLICATIONS

Office Action issued in the corresponding JP Application No. 2005-306224 dated Nov. 16, 2010 with English translation.

* cited by examiner

*Primary Examiner* — Samuel M Heinrich
(74) *Attorney, Agent, or Firm* — Harness, Dickey & Pierce, PLC

(57) ABSTRACT

An abnormality determination and estimation device for a weld product in a welding process includes a jig device and an AE sensor. The jig device holds the product by a holding face, through which the jig device and the product are in close contact with each other. The AE sensor detects an elastic wave in the jig device. Accordingly, abnormality detection accuracy can be improved, and abnormalities can be discriminated.

9 Claims, 5 Drawing Sheets

ABNORMALITY DETERMINATION AND ESTIMATION METHOD, AND ABNORMALITY DETERMINATION AND ESTIMATION DEVICE FOR WELD PRODUCT

CROSS REFERENCE TO RELATED APPLICATION

This application is based on Japanese Patent Application No. 2005-306224 filed on Oct. 20, 2005, the disclosure of which is incorporated herein by reference in its entirety.

BACKGROUND OF THE INVENTION

1. Field of the Invention

The present invention relates to an abnormality determination and estimation method for a weld product in a welding process and an abnormality determination and estimation device. For example, an elastic wave generated in a weld product by a welding process is used for determining and estimating an abnormality of the weld product.

2. Description of Related Art

US 2004/0249611 A1 corresponding to JP-A-2004-358487 discloses an abnormality determination and estimation device. The device determines and estimates a presence or absence of an abnormality of a product of a plastic working using an acoustic emission (AE) sensor. The AE sensor can detect an elastic wave generated in a local deformation and destruction.

The AE sensor is provided in a plastic working device, e.g., press die. An elastic wave detected by the AE sensor in each working process is compared with that in non-defective working process. Thus, the device can estimate a determination and discrimination for the abnormalities of the product.

In the device disclosed above, the determination of the abnormality in the product of the plastic working can be easily estimated by providing the AE sensor in the plastic working device, e.g., press die. In contrast, in a welding process, the AE sensor may have to be disposed directly to a weld product, in which metals are welded at a joint portion by heating. This is because the elastic wave is generated when the metals are expanded and contracted by repeating heating and cooling the joint portion. However, if the AE sensor is put on and taken off in each welding process, the process number may be increased such that the productivity may be lowered.

Further, a level of the elastic wave in the welding process may be too small to be detected. Furthermore, in a conventional art, a destruction test may be required for the estimation of the abnormality in the welding process. In the destruction test, generally, the joint portion may have to be destroyed.

SUMMARY OF THE INVENTION

In view of the foregoing and other problems, it is an object of the present invention to provide an abnormality determination and estimation method, and an abnormality determination and estimation device for a weld product in a welding process such that a detection accuracy for an abnormality can be improved and the abnormality can be discriminated.

According to a first example of the present invention, an abnormality determination and estimation device for a weld product includes a jig device for holding the product by a holding face and an AE sensor for detecting an elastic wave in the jig device. The jig device and the product are in close contact with each other through the holding face.

According to a second example of the present invention, an abnormality determination and estimation method of a weld product in a laser welding process includes a holding step, a detecting step and a discriminating step. In the holding step, the product is held in a jig device by a chuck mechanism with a holding pressure equal to or more than a predetermined pressure. In the detecting step, an elastic wave generated in the jig device is detected by an AE sensor located in the jig device. In the discriminating step, at least one of a welding penetration depth, a welding bead length and a welding skip is discriminated as an abnormality based on the elastic wave detected by the AE sensor.

According to the first and second examples, a detection accuracy for an abnormality can be improved and the abnormality can be discriminated.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF PREFERRED EMBODIMENTS

First Embodiment

Figure 1:
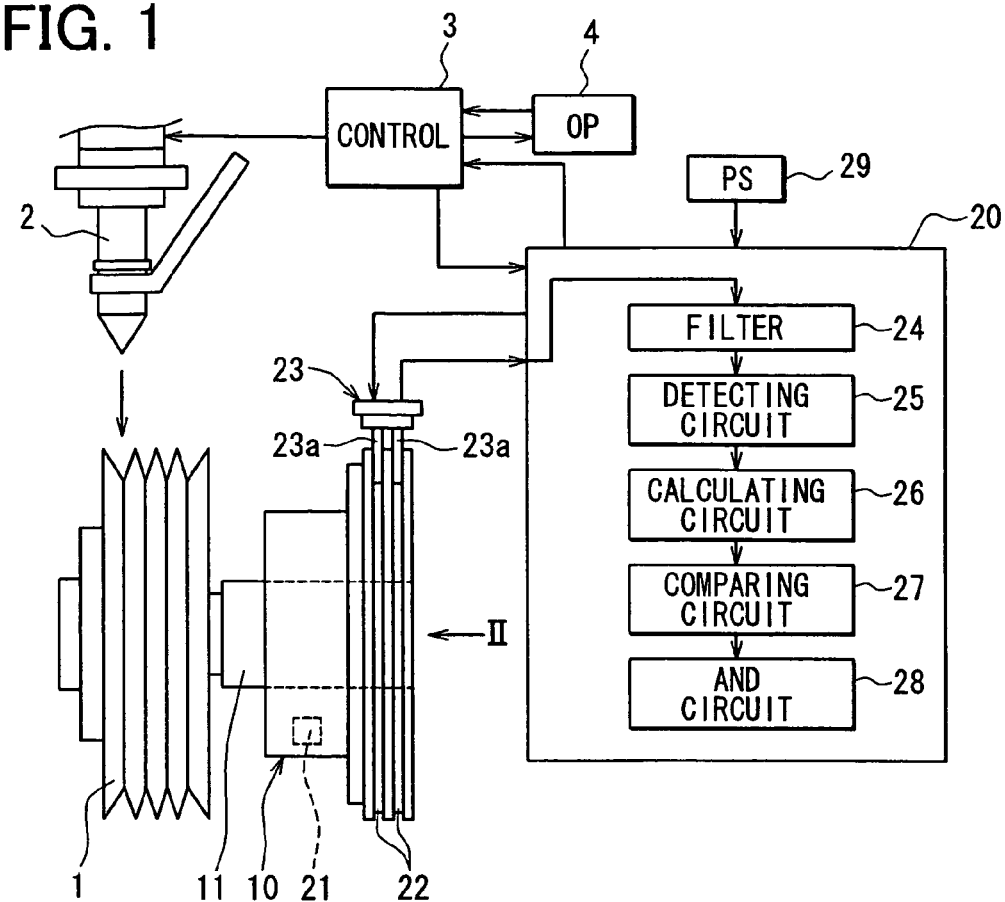
FIG. 1 is a schematic diagram showing an abnormality determination and estimation device according to a first embodiment of the present invention.

As shown in FIG. 1, an abnormality determination and estimation device in a first embodiment includes a jig device 10 for holding a weld product 1, an acoustic emission (AE) sensor 21 for detecting an elastic wave, a controlling device 20, a slip ring 22 and a brush station 23. The controlling device 20 controls an abnormality determination in a welding process based on the elastic wave detected by the AE sensor 21. The slip ring 22 and the brush station 23 transmit a signal of the elastic wave detected by the AE sensor 21 to the controlling device 20 as a transmitting device.

A laser radiating portion 2 of a laser welding device radiates a laser to the product 1. A laser welding controlling unit 3 controls the laser welding device. An operating panel 4 for operating the laser welding device includes an ON/OFF switch (not shown) and an informing member (not shown), e.g., display lamps for indicating abnormality types.

The operating panel 4 and the laser welding controlling unit 3 are electrically connected such that an operation signal can be output from the operating panel 4 into the laser welding controlling unit 3, and an indication signal can be input from the laser welding controlling unit 3 into the operating panel 4. Further, the laser welding controlling unit 3 and the controlling device 20 are electrically connected such that an operation signal indicating an operation state of the laser welding device can be output from the laser welding controlling unit 3 into the controlling device 20, and an indication signal indicating an abnormality type is input from the controlling device 20 into the laser welding controlling unit 3.

Figure 4:
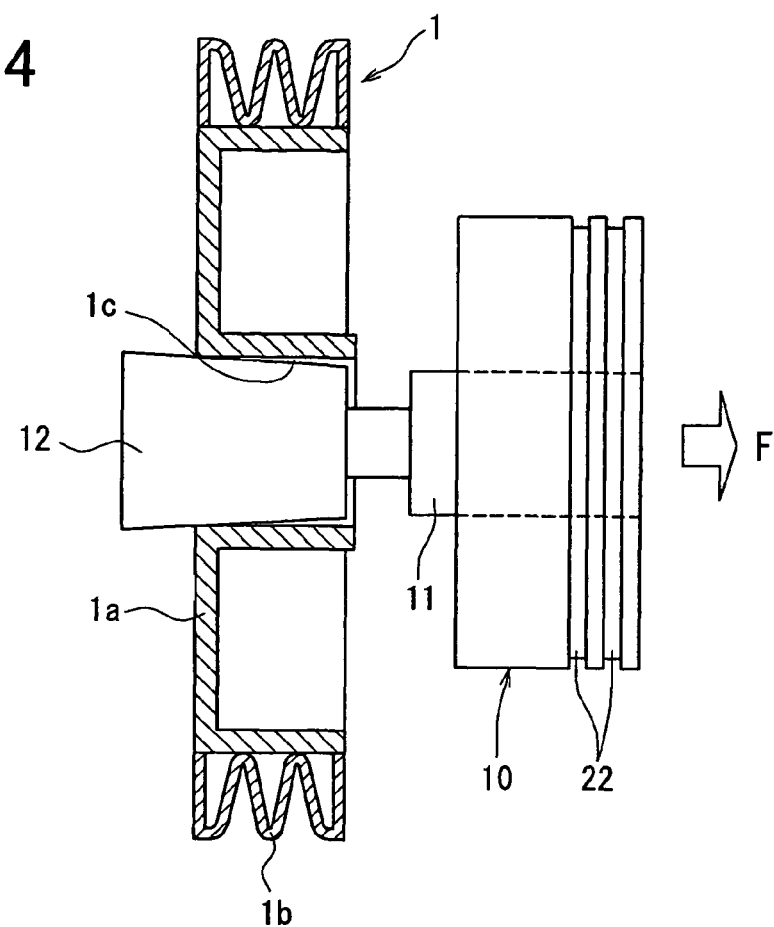
FIG. 4 is a schematic diagram showing a holding state between a weld product and a jig device.

As shown in FIG. 4, the product 1 includes an approximately round shaped rotor 1a and an approximately round shaped pulley 1b in a radical direction, for example. The rotor 1a has a cylindrical inner surface, and the pulley 1b is welded to the rotor 1a. An outer periphery of the rotor 1a and an inner periphery of the pulley 1b are jointed by radiating a laser to a side of the pulley 1b from the laser radiating portion 2. A chuck portion 12 to be described below has a tapered outer surface contacting the cylindrical inner surface of the rotor 1a.

Figure 5:
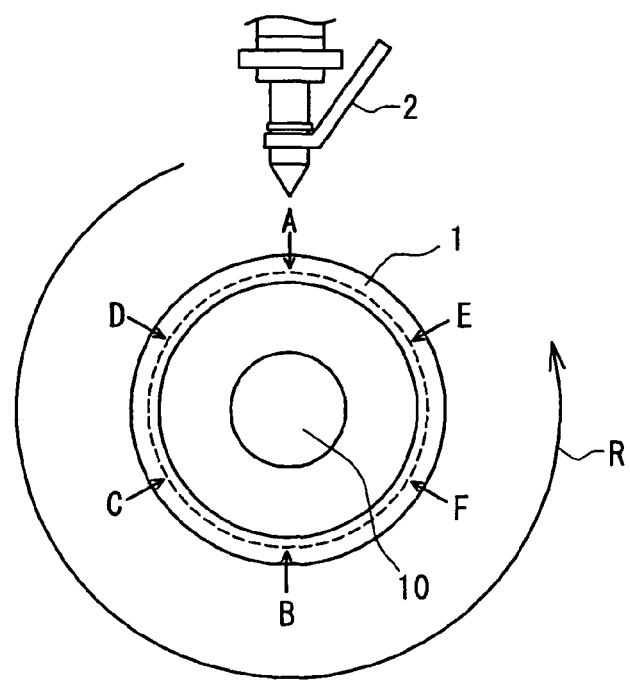
FIG. 5 is a pattern diagram showing a welding procedure for a weld product in a laser welding.

An incidence angle of the laser radiating portion 2 is fixed such that a welding angle becomes 0° in this embodiment. The welding angle is defined as an angle between a laser radiating direction and a direction perpendicular to a center axis of the rotor 1a and the pulley 1b. As shown in FIG. 5, a welded area is divided into several areas, e.g., six areas from A to F. The product 1 is rotated in a direction R shown in FIG. 5 such that the areas are welded in rotation.

First, the product 1 is held by the jig device 10, and disposed at a predetermined position such that the laser radiating portion 2 faces an area A. The laser welding is performed to the area A to have a predetermined welding bead length, e.g., about 20 mm, with rotating the product 1.

Next, the product 1 is rotated by 180° in the direction R such that an area B is disposed to face the laser radiating portion 2, and a laser welding is performed to the area B to have a predetermined welding bead length. Then, the product 1 is rotated by 60° in the direction R such that an area C is disposed to face the laser radiating portion 2, and a laser welding is performed to the area C to have a predetermined welding bead length. Then, the product 1 is rotated by 60° in the direction R such that an area D is disposed to face the laser radiating portion 2, and a laser welding is performed to the area D to have a predetermined welding bead length. Then, the product 1 is rotated by 120° in the direction R such that an area E is disposed to face the laser radiating portion 2, and the laser welding is performed to the area E to have a predetermined welding bead length. Then, the product 1 is rotated by 60° in the direction R such that an area F is disposed to face the laser radiating portion 2, and a laser welding is performed to the area F to have a predetermined welding bead length. Accordingly, the six areas from A to F can be welded by lasers in this order by rotation.

The jig device 10 holds the product 1 and performs a positioning for the welding areas as described above. Further, the jig device 10 includes the AE sensor 21, the slip ring 22 and the brush station 23. The AE sensor 21 is a piezoelectric sensor for detecting an elastic wave generated when a solid material is deformed by a stress applied thereto. In this embodiment, when a laser welding is performed to the product 1, the welded areas A-F are repeatedly heated and cooled by the lasers. Therefore, a metal material is expanded and contracted such that elastic waves are generated.

The AE sensor 21 is disposed not in the product 1 but in the jig device 10. To be specific, the jig device 10 holds the product 1 such that an elastic wave generated in the product 1 can be transmitted to the jig device 10.

To be more specific, as shown in FIG. 4, an axis portion 11 of the jig device 10 is formed such that a bearing portion 1c formed in the rotor 1a can be held by a chuck mechanism. The taper-shaped chuck portion 12 is formed at an end of the axis portion 11, and the chuck portion 12 and the bearing portion 1c are fitted into each other. Further, a predetermined force F is applied in an arrow direction shown in FIG. 4 such that a holding area between the chuck portion 12 and the bearing portion 1c can be formed. In the holding area, the chuck portion 12 and the bearing portion 1c are in close contact with each other. Accordingly, the jig device 10 can hold the product 1 by the chuck mechanism without forming a gap between the bearing portion 1c and the chuck portion 12.

The predetermined force F may be equal to or more than 1 kgf/cm$^2$ based on experiments, as for the product 1 in the first embodiment. Thereby, an elastic wave generated in the product 1 can be effectively transmitted to the jig device 10 without an attenuation. Thus, the AE sensor 21 can be provided in the jig device 10.

Figure 3:
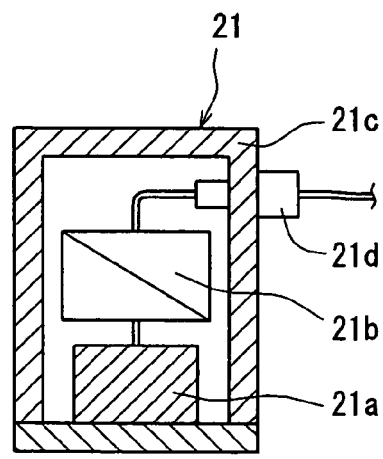
FIG. 3 is a schematic diagram showing an AE sensor according to the first embodiment.

As shown in FIG. 3, the AE sensor 21 includes a piezoelectric element 21a, an amplifier 21b and a case 21c. The element 21a detects an elastic wave. The amplifier 21b amplifies a level value of the elastic wave detected by the element 21a. An end of the element 21a is closely jointed to an inner bottom face of the case 21c, as shown in FIG. 3.

The amplifier 21b is disposed above the element 21a, and the element 21a and the amplifier 21b are electrically connected. Electricity is supplied to the amplifier 21b from a terminal 21d, and the amplifier 21b and the terminal 21d are electrically connected such that an amplified elastic wave can be output to outside. The terminal 21d is electrically connected to a slip ring 22 (transmitting device) to be described below.

Figure 2:
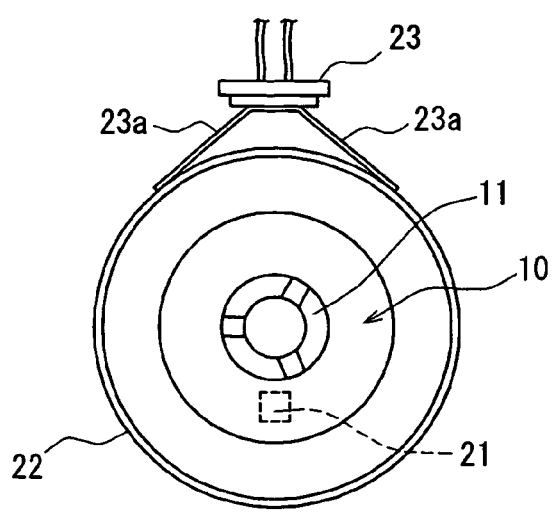
FIG. 2 is a side view of the device shown in FIG. 1 in direction of the arrow 11.

As shown in FIGS. 1 and 2, the AE sensor 21 is provided in the jig device 10 such that a face of the element 21a is parallel to the axis center of the axis portion 11. To be specific, the AE sensor 21 is disposed in a position corresponding to the area B opposed to the area A. An elastic wave is defined as an acoustic emission (AE).

As shown in FIGS. 1 and 2, the slip ring 22 and a brush station 23 construct a transmitting device. The slip ring 22 is a collecting portion for transmitting a detected signal of an elastic wave detected by the AE sensor 21 to outside. Further, the slip ring 22 is a ring-shaped connecting terminal made of a conductive material. In this embodiment, two of the slip rings 22 are disposed at an end of the jig device 10 in a concave-shape as shown in FIG. 1.

The brush station 23 is electrically connected to the slip rings 22. The brush station 23 is a connecting portion including brushes 23a, and the brush 23a is electrically connected to the slip ring 22 such that the slip ring 22 and the controlling device 20 are electrically connected by the brush 23a.

That is, a signal of an elastic wave detected by the AE sensor 21 is electrically connected to the controlling device 20 through the slip ring 22 and the brush station 23. Because the slip ring 22 is integrally formed to the jig device 10, the slip ring 22 can rotate in one direction together with the jig device 10. The brush 23a is electrically in contact with the slip ring 22, and a gradient angle of the contact portion is made smaller. Thereby, a noise of the brush 23a can be decreased in the jig device 10 when the slip ring 22 is rotated.

Each of the slip rings 22 is integrally constructed with the jig device 10 and insulated from the jig device 10. Electricity for the amplifier 21b and detected signals amplified by the amplifier 21b are supplied to one of the slip rings 22, while the other slip ring 22 is used for a common grounding wire.

An upstream end of the brush station 23 is electrically connected to the controlling device 20. The controlling device 20 for determining and estimating an abnormality is mainly constructed by a microcomputer, and an internal ROM (not shown) of the microcomputer includes an abnormality determination controlling program for determining and estimating a presence or absence of an abnormality in the product 1.

That is, a presence or absence of an abnormality in a welding process is determined and estimated based on the elastic wave detected by the AE sensor 21. Further, when a presence of an abnormality is determined, a controlling program discriminates a type of the abnormality, and indicates the abnormality type. Then, the laser welding device is stopped by the controlling program.

Therefore, a signal of the elastic wave detected by the AE sensor 21 is input into the controlling device 20 through the slip ring 22 and the brush station 23, and an operation signal from the operating panel 4 is also input into the controlling device 20 through the laser welding controlling unit 3. Then, the controlling device 20 outputs signals to the laser welding controlling unit 3. That is, an indication signal is output into the operating panel 4 from the unit 3, and a stopping signal is output into the laser welding device from the unit 3.

As shown in FIG. 1, the controlling device 20 includes a filter 24, a wave detecting circuit 25, a calculating circuit 26, a comparing circuit 27 and an AND circuit 28 so as to process an input elastic wave. A power supply 29 supplies the controlling device 20 and the amplifier 21b with electricity.

The filter 24 includes a high pass filter (HPF) for removing noises in a high-frequency area, and a low pass filter (LPF) for removing noises in a low-frequency area. The wave detecting circuit 25 detects the noise-removed elastic wave and converts the wave data. Specifically, the circuit 25 converts an effective value of the elastic wave to a wave shape.

The calculating circuit 26 calculates amplitude and energy based on the detected wave shape. That is, the circuit 26 calculates an integrated value by integrating the detected wave shape. The comparing circuit 27 compares the integrated value with a predetermined determination value set in advance.

The AND circuit 28 outputs an indication signal as an abnormality signal when the integrated value is more than the predetermined determination value. In this embodiment, at least a welding penetration depth, a welding bead length and a welding skip are discriminated in each of the areas A-F as a laser welding abnormality.

When the welding penetration depth is less than a predetermined depth in one of the areas A-F, the area is determined to be a welding defect. In this embodiment, a presence or absence of the welding defect is determined by comparing the integrated value with that for a non-defective welding.

When the welding bead length is less than a predetermined length in one of the areas A-F, the area is determined to be a welding defect. In this embodiment, a presence or absence of the welding defect is determined by comparing an elastic wave generating time detected by the AE sensor 21 with that for a non-defective welding.

The welding skip is one of welding defects, in which a predetermined point to be welded is not welded by skipping. In this embodiment, a presence or absence of the welding skip is determined by monitoring whether an elastic wave detected by the AE sensor 21 is output or not in the laser welding.

Figure 6:
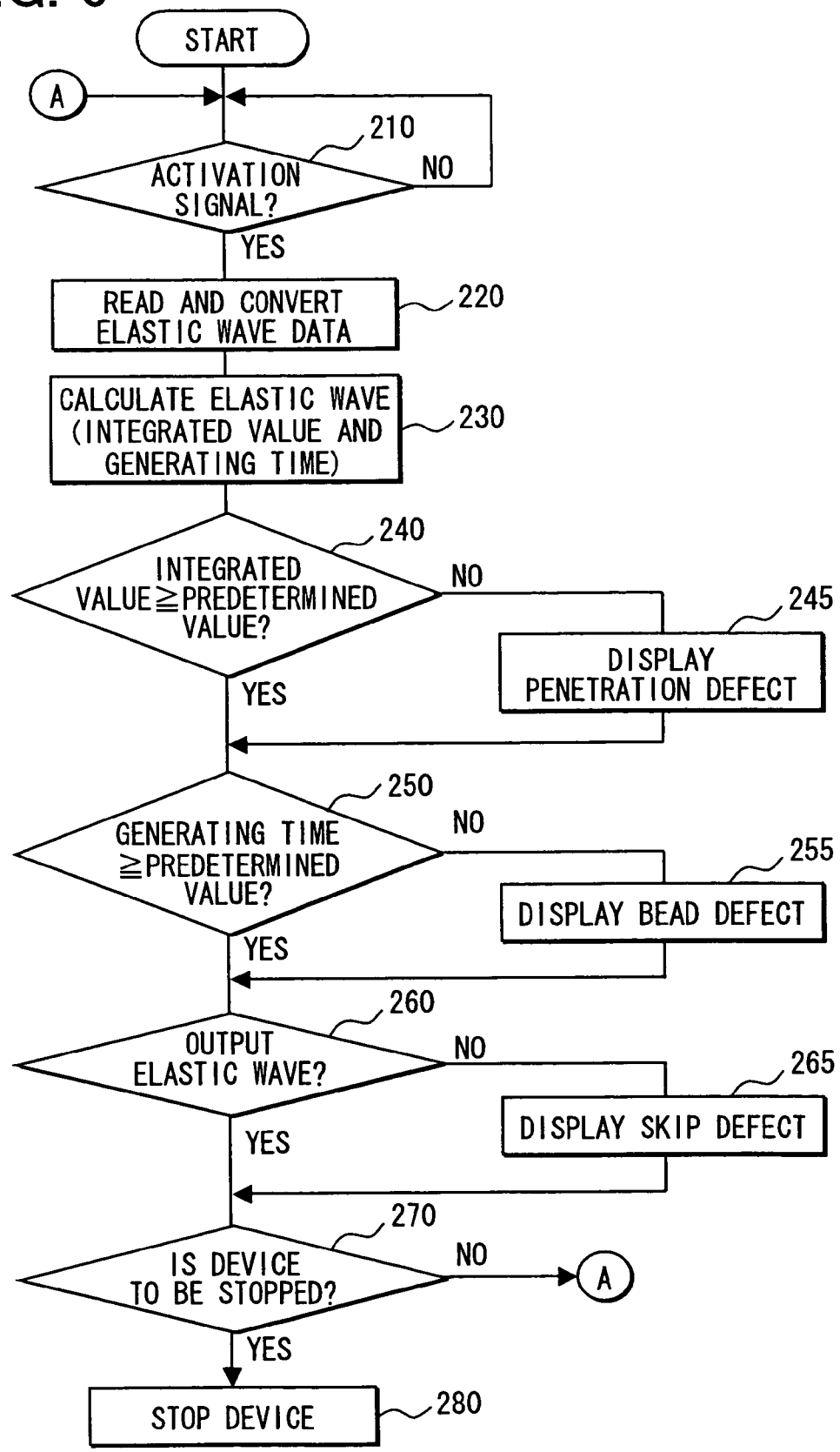
FIG. 6 is a flow chart showing a controlling process by a controlling device.

Next, an operation of the abnormality determination and estimation device is described based on a flow chart shown in FIG. 6. First, the product 1 is held by the jig device 10, and rotated so as to perform a positioning of the area A.

Then, when a switch (not shown) disposed in the operating panel 4 is turned on, an operation signal is input into the controlling device 20 through the laser welding controlling unit 3. Thereby, the laser welding device is activated and radiates a laser to the area A from the laser radiating portion 2 so as to start the laser welding. The jig device 10 is rotated with a predetermined speed so as to form the welding bead length.

When the welding in the area A is finished, the jig device 10 and the laser welding device are controlled such that the welding is automatically performed in a predetermined order, i.e., from the area A to the area F.

In the controlling device 20, as shown in FIG. 6, a presence or absence of an activation signal is determined at Step 210. If an activation signal is determined to be present, a main routine of a controlling process starts and a memory (RAM) for processing data is initialized. Then, an elastic wave detected by the AE sensor 21 is read and converted at Step 220.

That is, when the areas A-F are welded by lasers, elastic waves generated in the product 1 are transmitted to the jig device 10. At this time, the piezoelectric element 21a detects the elastic waves. Then, the detected elastic waves are amplified by the amplifier 21b, and input into the controlling device 20 through the slip rings 22 and the brush station 23.

The amplified elastic waves are read in the controlling device 20, noises are removed by the filter 24, and data conversions are performed in the wave detecting circuit 25. The converted elastic waves are calculated in the calculating circuit 26. In this embodiment, three abnormalities in a welding process are discriminated and estimated using the converted data in the calculation.

Specifically, an integrated value and a generating time of the elastic wave are calculated in the calculating circuit 26 based on each of the converted elastic waves in the areas A-F. Then, the integrated value is determined to be equal to or more than a first predetermined value at Step 240. The first predetermined value is a determination value for an elastic wave when a non-defective welding is performed. The non-defective determination values are different in the areas A-F.

Figure 7:
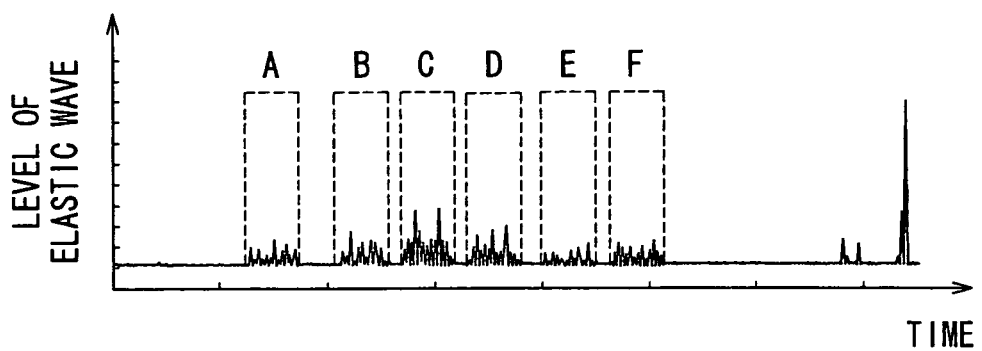
FIG. 7 is a view showing levels of elastic waves in each of welded areas A-F with a welding angle 0°.

Levels of the elastic waves detected by the AE sensor 21 are shown in FIG. 7 when the welding angle is 0° and an output power of the laser welding is 4.8 kW. In FIG. 7, non-defective weldings are performed in the areas A-F.

In this embodiment, when these non-defective weldings are performed, the elastic wave is converted based on a level of the elastic wave. The converted elastic wave is integrated, and the integrated value is calculated as the determination value. The determination value corresponding to each of the areas A-F is set in advance as the first predetermined value and memorized in a memory (not shown).

When the integrated value corresponding to each of the areas A-F is equal to or more than the first predetermined value at Step 240, the control program of the controlling device 20 proceeds to Step 250. If at least one of the integrated values in the areas A-F is less than the first predetermined value, a signal indicating a welding penetration defect is output into the operating panel 4 at Step 245.

At Step 250, a determination value corresponding to each of the areas A-F is set in advance as a second predetermined value and memorized in a memory (not shown). When an elastic wave generating time corresponding to each of the areas A-F is equal to or more than the second predetermined value at Step 250, the controlling device 20 proceeds to Step 260. If at least one of the elastic wave generating times in the areas A-F is less than the second predetermined value, a signal indicating a welding bead defect is output into the operating panel 4 at Step 255.

At Step 260, the elastic waves are determined to be output in the areas A-F. When the elastic waves are generated in the areas A-F, the controlling device 20 proceeds to Step 270. If the elastic wave is not output from the at least one of areas A-F, a signal indicating a welding skip defect is output into the operating panel 4 at Step 265.

Then, at Step 270, the laser welding device is determined to be stopped or not. If the indication signal is output from at least one of Steps 240, 250 and 260, the laser welding device is determined to be stopped at Step 270. If the indication signal is not output from any one of Steps 240, 250 and 260, the laser welding device is determined not to be stopped, and the controlling device 20 returns to Step 210.

If the indicating signal is output from any one of Steps 240, 250 and 260, the laser welding device is stopped at Step 280. A display lamp on the operating panel 4 for indicating each of the defects is lighted, when the indication signal is output at Steps 245, 255 and 265. That is, welding defects from Steps 245, 255 and 265 can be respectively indicated by display lamps on the operating panel 4.

According to the abnormality determination and estimation device in the first embodiment, the jig device 10 holds the product 1 and performs the positioning of the areas A-F by rotating the product 1. The jig device 10 can hold the product 1 by the holding face in close contact with each other. Thus, a low-leveled elastic wave can be transmitted to the jig device 10 through the holding face without attenuation.

Specifically, the jig device 10 can hold the product 1 by the chuck mechanism including the holding face such that a contact pressure of a chuck portion is equal to or more than a predetermined pressure.

Thus, the elastic wave generated in the product 1 can be transmitted to the jig device 10. Moreover, an abnormality detecting accuracy can be improved based on the elastic wave detected by the AE sensor 21.

Further, the AE sensor 21 includes the piezoelectric element 21a for detecting an elastic wave, and the amplifier 21b for amplifying the elastic wave. The AE sensor 21 is provided in the jig device 10 rotating together with the product 1. Therefore, the elastic wave can be amplified such that an output signal of the amplified elastic wave can be easily transmitted to outside.

Further, the slip ring 22 for transmitting the signal is disposed in the jig device 10. The slip ring 22 can transmit the output signal to outside without generating noises in the AE sensor 21. Because the rotating slip ring 22 transmits the output signal through the brush 23a, for example, noises are not generated in the AE sensor 21.

The abnormality determination controlling device 20 determines and estimates a presence or absence of an abnormality based on the elastic wave detected by the AE sensor 21. The controlling device 20 discriminates the welding penetration depth, the welding bead length and the welding skip. If the welding penetration depth is small, a welding defect may be caused in the laser welding. A presence or absence of this welding defect can be determined by comparing the integrated value with that for a non-defective welding.

If the welding bead length is less than a predetermined length, a welding defect may be caused. The welding bead length can be determined by monitoring the elastic wave generating time detected by the AE sensor 21.

The welding skip is one of welding defects, in which a predetermined point is not welded and is skipped. A presence or absence of the welding skip is easily determined by monitoring whether an elastic wave detected by the AE sensor 21 is output or not.

Therefore, these welding defects in a laser welding process can be easily discriminated. Moreover, if at least one of the abnormalities is determined to be present in the areas A-F, the laser welding device can be stopped. Accordingly, a productivity can be improved because unnecessary weldings are not performed.

Second Embodiment

The above-described embodiment is only an example for the abnormality determination and estimation device of the present invention. It is to be noted that various changes and modifications will be become apparent to those skilled in the art.

Figure 8:
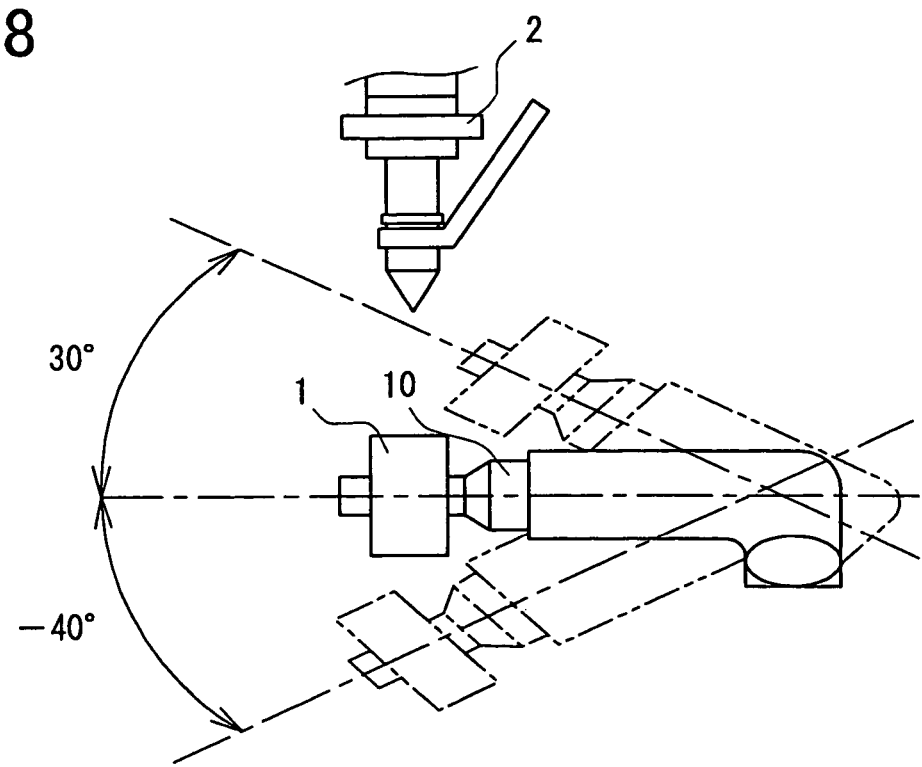
FIG. 8 is a pattern diagram showing welding angles between a laser welding device and a weld product according to a second embodiment.
Figure 9A:
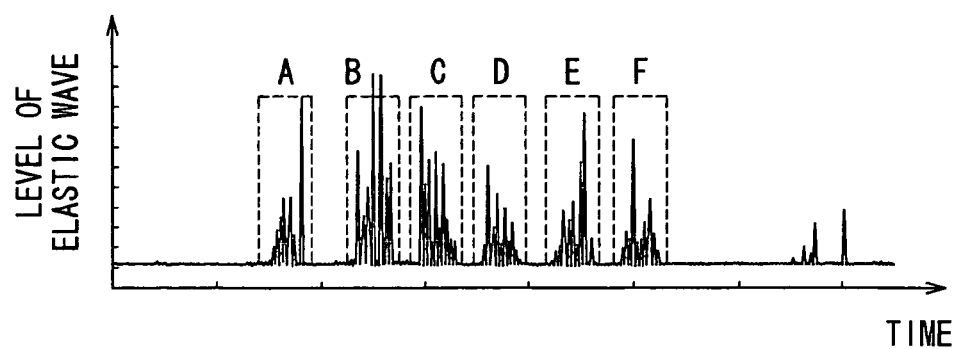
FIG. 9A is a view showing levels of elastic waves in each of welded areas A-F with a welding angle 30°.
Figure 9B:
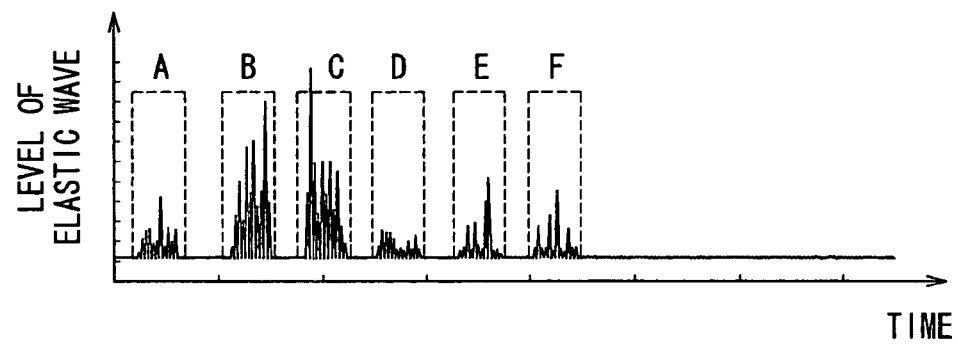
FIG. 9B is a view showing levels of elastic waves in each of welded areas A-F with a welding angle −40°.

As shown in FIG. 8, the incidence angle (welding angle) may be variable between about 30° and about −40° in the jig device 10. In this case, the determination value for a non-defective welding is different from that in the first embodiment. Therefore, as shown in FIGS. 9A and 9B, non-defective weldings are performed in the areas A-F, corresponding to each welding angle. Then, a determination value in each of the areas A-F is set as a first predetermined value based on an elastic wave level detected by the AE sensor 21.

In FIG. 9A, non-defective weldings are performed in the areas A-F, when the welding angle is 30° and the output power is 5.5 kW. In FIG. 9B, non-defective weldings are performed in the areas A-F, when the welding angle is −40° and the output power is 5.5 kW in FIG. 9B. According to the FIGS. 9A and 9B, the elastic wave levels are different when the welding angles are changed. Moreover, the elastic wave levels are different when the output power is changed. Therefore, the determination value can be set to correspond to the welding angles and the output powers.

Other Embodiments

The abnormality determination and estimation device may be used for an arc welding device and an argon welding device.

Such changes and modifications are to be understood as being within the scope of the present invention as defined by the appended claims.

What is claimed is:

1. A weld abnormality determination and estimation device for a product, the device comprising:
    a jig device for holding the product by a holding face, through which the jig device and the product are in close contact with each other;
    an AE sensor for detecting an elastic wave in the jig device; and
    a controlling device for determining and estimating a presence or absence of an abnormality of a welding penetration depth, and abnormality of a welding bead length and an abnormality of a welding skip in a laser welding process based on the elastic wave detected by the AE sensor, wherein
    the controlling device discriminates between the welding penetration depth, the welding bead length and the welding skip;

the jig device performs a positioning of a welded area in the product by rotating the product; and the AE sensor is provided in the jig device.

2. The device according to claim 1, wherein:

the jig device includes a chuck portion which generates a contact pressure relative to the product, the contact pressure being equal to or more than a predetermined pressure.

3. The device according to claim 1, wherein:

the AE sensor includes a piezoelectric element for detecting the elastic wave, and an amplifier for amplifying the elastic wave detected by the piezoelectric element.

4. The device according to claim 1, wherein:

the jig device includes a transmitting device for transmitting an output signal of the elastic wave detected by the AE sensor;

the transmitting device includes a slip ring for collecting the signal, and a brush mechanism for transmitting the signal, so as to prevent generation of noises in the AE sensor.

5. The device according to claim 2, wherein:

the weld product includes a first member having a cylindrical inner surface, and a second member welded to the first member; and the chuck portion has a tapered outer surface, contacting the cylindrical inner surface.

6. The device according to claim 3, wherein:

the piezoelectric element is disposed parallel to a center axis of the jig device; and the amplifier is disposed above the piezoelectric element.

7. The device according to claim 1, wherein the welding penetration depth is determined to be abnormal based on a comparison between an integrated value of the detected elastic wave and a predetermined value.

8. The device according to claim 1, wherein the welding bead length is determined to be abnormal based on a comparison between a generating time of the detected elastic wave and a predetermined value.

9. The device according to claim 1, wherein the welding skip is determined to be abnormal based on an absence of an output of the detected elastic wave in a weld area.

* * * * *